United States Patent
Dicken

(10) Patent No.: US 10,447,021 B1
(45) Date of Patent: Oct. 15, 2019

(54) SWITCH BOXES AND OUTLET BOXES WITH NO WIRE NUTS

(71) Applicant: Larry J. Dicken, Logan, OH (US)

(72) Inventor: Larry J. Dicken, Logan, OH (US)

( * ) Notice: Subject to any disclaimer, the term of this patent is extended or adjusted under 35 U.S.C. 154(b) by 0 days.

(21) Appl. No.: 16/198,701

(22) Filed: Nov. 21, 2018

(51) Int. Cl.
　　*H02G 3/08* (2006.01)
　　*H02G 3/16* (2006.01)
　　*H01R 9/24* (2006.01)

(52) U.S. Cl.
　　CPC ............. *H02G 3/16* (2013.01); *H02G 3/083* (2013.01); *H01R 9/24* (2013.01)

(58) Field of Classification Search
　　CPC ... H02G 3/08; H02G 3/16; H02G 3/18; H01R 25/006
　　See application file for complete search history.

(56) References Cited

U.S. PATENT DOCUMENTS

| | | | | |
|---|---|---|---|---|
| 2,528,989 | A * | 11/1950 | Ammells | H02G 3/16 174/59 |
| 3,716,651 | A * | 2/1973 | Werner | H01R 25/006 174/53 |
| 5,352,850 | A * | 10/1994 | Norris | H02G 3/16 174/51 |
| 6,191,361 | B1 * | 2/2001 | Matty | H01R 24/76 174/53 |
| 6,786,766 | B1 * | 9/2004 | Chopra | H01R 4/4827 439/441 |
| 7,294,017 | B2 * | 11/2007 | Scott | H01R 9/2491 439/535 |
| 7,642,454 | B2 * | 1/2010 | Waites | H02G 3/0493 174/50 |
| 9,839,182 | B2 * | 12/2017 | Mason | A01G 7/045 |
| 2003/0038572 | A1 * | 2/2003 | Kiermaier | H01R 33/0836 313/1 |
| 2006/0216988 | A1 * | 9/2006 | Scott | H01R 9/2433 439/535 |

* cited by examiner

Primary Examiner — Tho D Ta
(74) Attorney, Agent, or Firm — Ronald J. Koch

(57) ABSTRACT

A switch box or outlet box with no wire nuts having three bus bars, one for each of the hot, neutral, and ground wires of a three conductor wire. Separate conductors are connected between the bus bars and an electrical component, such as an outlet or switch thereby eliminating the need for wire nuts.

3 Claims, 5 Drawing Sheets

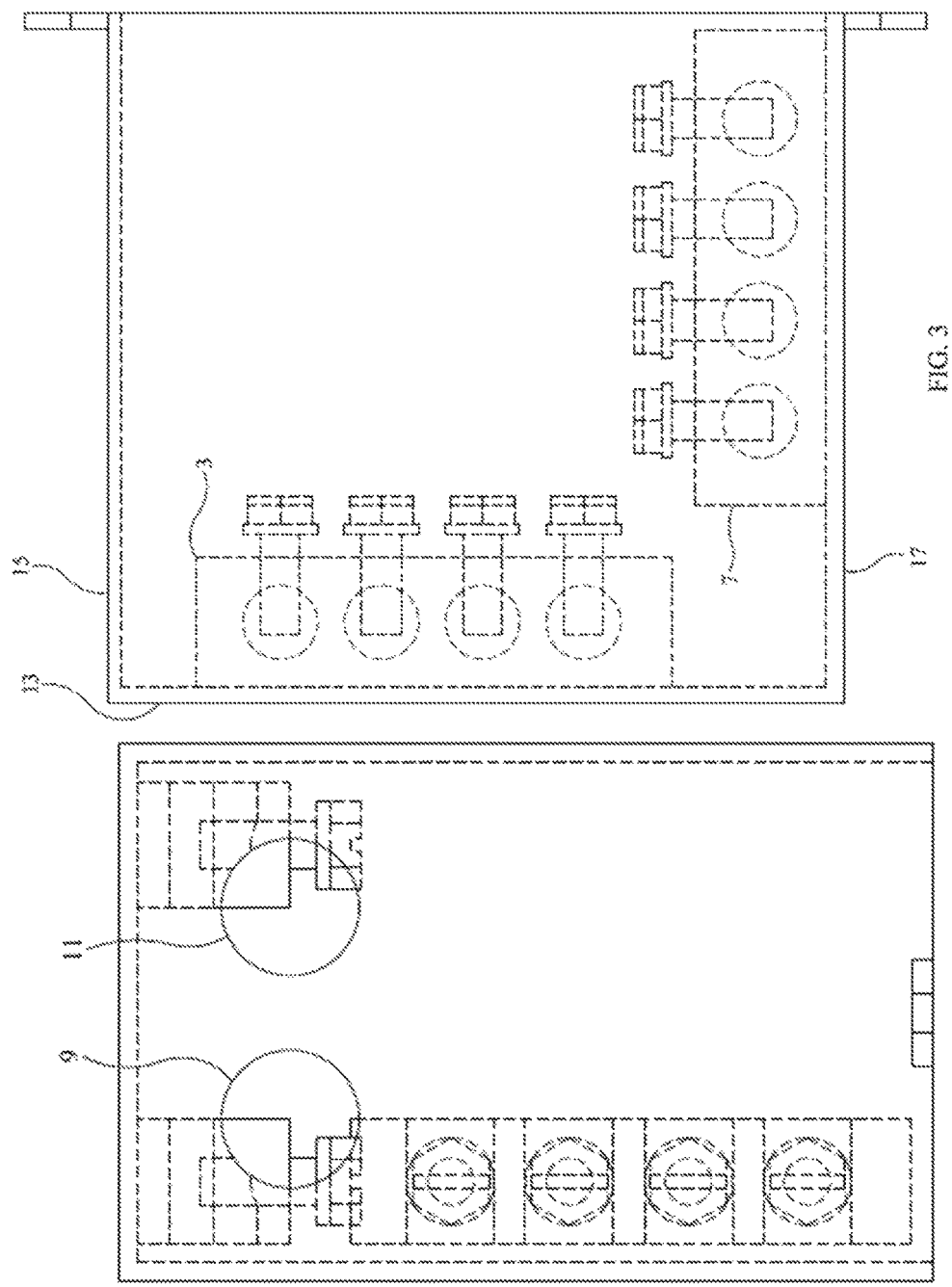

Fig. 7

| |
|---|
| Insert a three conductor wire 23 into an aperture of the enclosure 2 (100) |
| Place a bend in a hot conductor 24 of the three conductor wire 23 such that a portion of the hot conductor 24 is horizontally oriented (101) |
| Insert said horizontally oriented portion of the hot conductor 24 into said one or more horizontally oriented female sockets 19 of said first bus bar 3 (102) |
| Releasably connect a first end of a second hot conductor 34 to said one or more horizontally oriented female sockets 19 of said first bus bar 3 (103) |
| Releasably connect a second end of said second hot conductor 34 to a hot connector 31 of an outlet or switch 30 (104) |
| Place a bend in a neutral conductor 25 of the three conductor wire 23 such that a portion of the neutral conductor 25 is horizontally oriented (105) |
| Insert said horizontally oriented portion of the neutral conductor 25 into said one or more horizontally oriented female sockets 19 of said second bus bar 5 (106) |
| Releasably connect a first end of a second neutral conductor 35 to said one or more horizontally oriented female sockets 19 of said second bus bar 5 (107) |
| Releasably connect a second end of said second neutral conductor 35 to a neutral connector 32 of said outlet or switch 30 (108) |
| Place a bend in a ground conductor 26 of the three conductor wire 23 such that a portion of the ground conductor 26 is horizontally oriented (109) |
| Insert said horizontally oriented portion of the ground conductor 26 into said one or more horizontally oriented female sockets 19 of said third bus bar 7 (110) |
| Releasably connect a first end of a second ground conductor 36 to said one or more horizontally oriented female sockets 19 of said third bus bar 7 (111) |
| Releasably connect a second end of said second ground conductor 36 to a ground connector 33 of said outlet or switch 30 (112) |

SWITCH BOXES AND OUTLET BOXES WITH NO WIRE NUTS

BACKGROUND AND SUMMARY

The subject technology relates generally to systems and methods of wiring outlet boxes or switch boxes, and specifically to the various ways outlets or switches are operatively connected to outlet boxes or switch boxes.

Conventional outlet boxes or switch boxes are problematic at least because wire nuts must be used to connect two wires to each other. For example, in a residential home wiring scheme, a series of wall outlets are sequentially connected in parallel. A three conductor (hot, neutral, ground) wire is inserted into an outlet box and connected to an outlet. In order to connect that outlet box to another outlet box, another three conductor (hot, neutral, ground) wire must be connected. This has conventionally been accomplished with wire nuts. The end result is a bulky and cumbersome group of wires and wire nuts that must be squeezed into the outlet box as the outlet is connected. The subject technology solves this problem by eliminating the wire nuts by providing bus bars mounted inside of the outlet (or switch) box thereby allowing two separate three-conductor wires and the wires connecting the outlet (or switch) to be connected to bus bars. As shown in FIG. 4, the second three-conductor wire (shown in dashed lines) is easily connected to the bus bars without the need for wire nuts.

BRIEF DESCRIPTION OF THE DRAWINGS

FIG. 7 Depicts a flow chart according to one aspect of the subject technology

REFERENCE NUMERALS IN DRAWINGS

Figure 1:
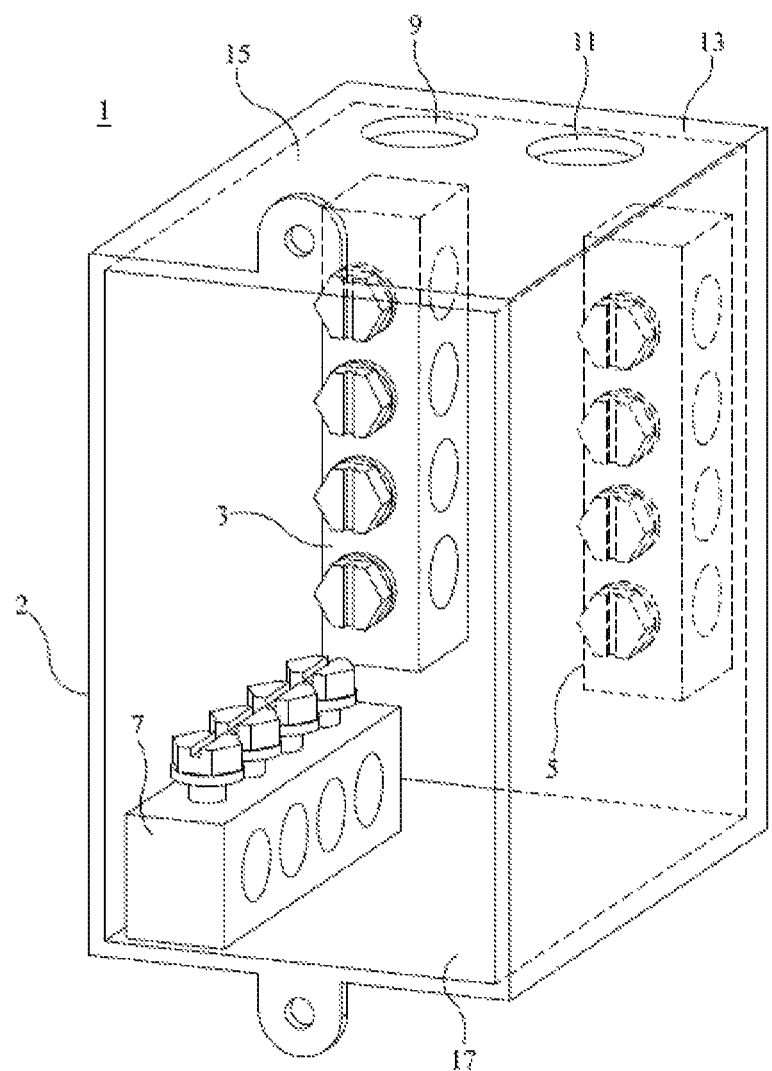
FIG. 1 Depicts a perspective view of enclosure 2 in one aspect of the subject technology FIG. 2 Depicts a top view of enclosure 2 in one aspect of the subject technology FIG. 3 Depicts a side view of enclosure 2 in one aspect of the subject technology FIG. 4 Depicts a front view of enclosure 2 in one aspect of the subject technology FIG. 5 Depicts a perspective view of a typical bus bar used in accordance with some aspects of the subject technology FIG. 6 Depicts a block diagram of switch box or outlet box 1 connected to outlet or switch 30

The table below lists the reference numerals employed in the figures, and identifies the element designated by each numeral.

1 switch box or outlet box 1
2 enclosure 2
3 first bus bar 3
5 second bus bar 5
7 third bus bar 7
9 first aperture 9
11 second aperture 11
13 back wall 13 of enclosure 2
15 top wall 15 of enclosure 2
17 bottom wall 17 of enclosure 2
19 female socket 19
21 set screws 21
23 wire 23 (e.g. three conductor wire)
24 hot conductor 24 of three conductor wire 23
25 neutral conductor 25 of three conductor wire 23
26 ground conductor 26 of three conductor wire 23
30 electrical outlet or switch 30
31 hot connector 31 of outlet or switch 30
32 neutral connector 32 of outlet or switch 30
33 ground connector 33 of outlet or switch 30
34 second hot conductor 34
35 second neutral conductor 35
36 second ground conductor 36

DETAILED DESCRIPTION

In one aspect of the subject technology, a switch box or outlet box 1 with no wire nuts consists of an enclosure 2, a first bus bar 3, a second bus bar 5, and a third bus bar 7. A multi-conductor wire can be inserted into the enclosure (through an aperture, discussed elsewhere herein) and then connected to the bus bars. Individual Conductors are then connected from the bus bars to an outlet or switch to be energized. FIG. 1 depicts such an enclosure 2, having an open front which exposes first, second, and third bus bars, 5, 7, & 9, respectively. An outlet or switch 30 is operatively connected to each of said three bus bars according to the various aspects of the subject technology described herein. Thereafter, the outlet or switch 30 is removably secured to the enclosure 2 in accordance with conventional means as will be apparent to those of skill in the art. In one aspect, the subject technology consists only of a switch box with three bus bars mounted inside thereof. In one aspect, the subject technology consists only of an outlet box with three bus bars mounted inside thereof.

The first bus bar 3, the second bus bar 5, and the third bus bar 7 each have one or more horizontally oriented female sockets 19 adapted to be capable of releasably securing a conductor. In one aspect, a conductor is releasably secured to a female socket with a set screw 21 (e.g. FIG. 5). In another aspect, a friction fit is used. In one aspect (e.g. FIG. 5), the first bus bar 3, the second bus bar 5, and the third bus bar 7, each have at least three horizontally oriented female sockets 19, each being adapted to be capable of releasably securing a conductor.

In one aspect, the first bus bar 3 is mounted to a back wall 13 of the enclosure 2; the second bus bar 5 is mounted to the back wall 13 of the enclosure 2; and the third bus bar 7 is mounted to a bottom wall 17 of the enclosure 2; the enclosure 2 has a first aperture 9 disposed in a top wall 15 of the enclosure 2. The purpose of the aperture is to allow a conductor (e.g. multi-conductor wire) to be inserted therein for connection to the various bus bars.

Figure 5:
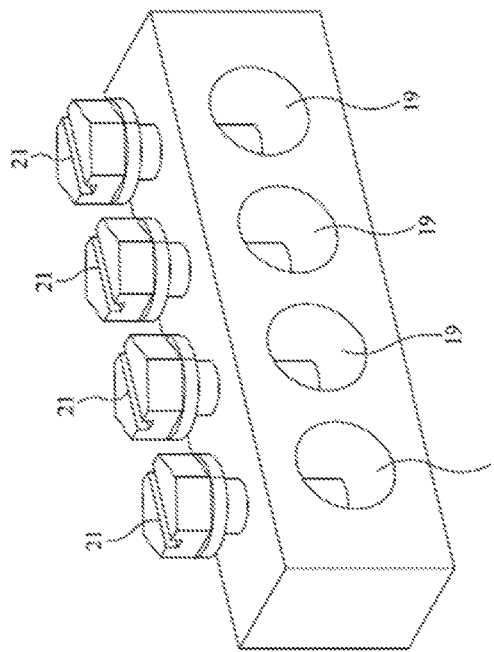
Figure 4:
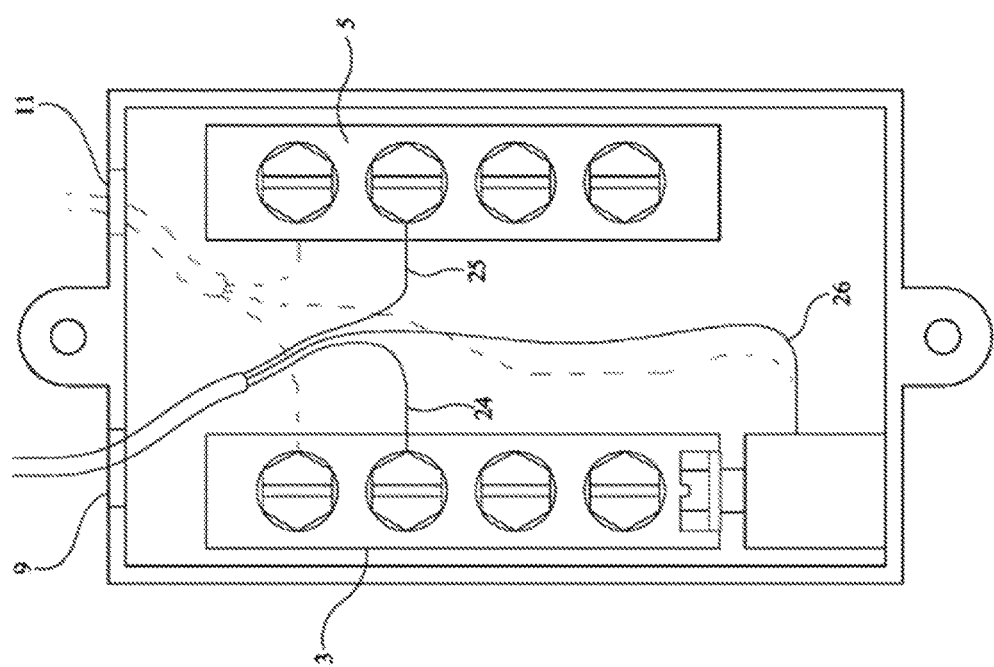
Figure 6:
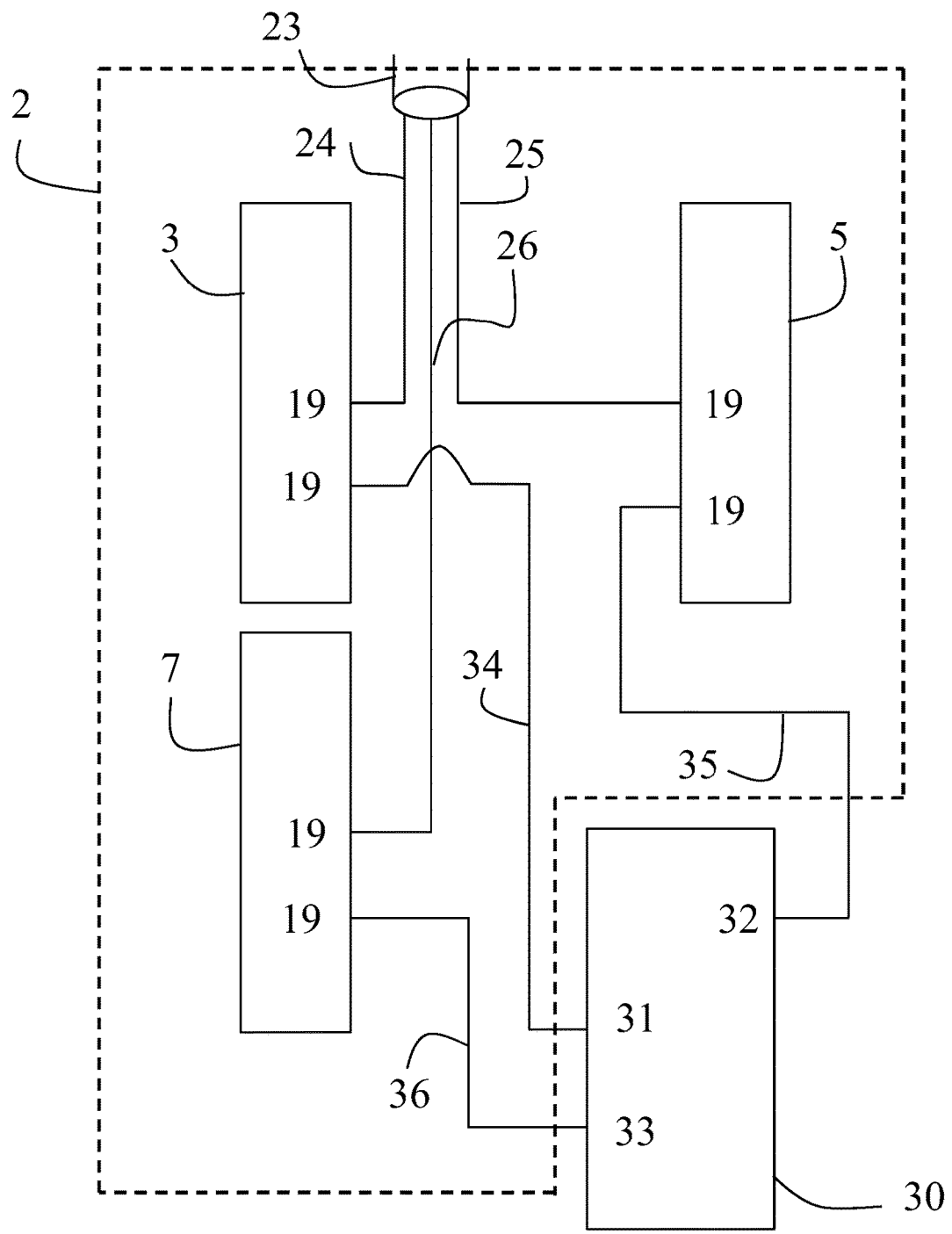

In one aspect, the first aperture 9 is adapted such that a vertically oriented wire 23 is inserted therein. It should be understood that "vertically oriented" and "horizontally oriented", as used herein, are relative terms used to describe the orientation of a conductor (e.g. hot conductor 24) found in wire 23 (e.g. a three conductor, 12 gauge electrical wire such as is used to wire a home) relative to female sockets 19 found in the various bus bars described herein (e.g. bus bar depicted in FIG. 5 showing four such female sockets). For example, a wire 23 having three conductors, hot 24, neutral 25, and ground 26, is inserted into first aperture 9 in a roughly vertical orientation as shown in FIG. 4. Since all three bus bars (first 3, second 5, and third 7) are mounted such that each female socket 19 is horizontally oriented, a given conductor must be bent from a relatively vertical orientation to a horizontal orientation so as to be capable of being inserted within the female socket. It is to be understood that "inserted", in this sense, can include releasable securement with set screws or friction fit.

In one aspect (FIG. 4), the first aperture 9 is aligned with the first bus bar 3; the enclosure 2 has a second aperture 11 disposed in the top wall 15 of the enclosure 2; and the second aperture 11 is aligned with the second bus bar 5. It should be understood that "aligned" as used to describe the relationship of an aperture (9, 11) to a bus bar (3, 5) is intended to describe the physical location so as to be relatively close to a bus bar to allow a wire 23 to be inserted within an aperture such that a conductor (e.g. 24) can be releasably inserted (e.g. by set screws 21 as shown in FIG. 5) within a female socket 19. As shown in FIG. 4, first aperture 9 is aligned with first bus bar 3, and second aperture 11 is aligned with second bus bar 5.

The term "energizing" as used herein, includes wiring an electrical component such as a switch or outlet so that electrical power can be delivered to the device. Thus, in this sense, a component can be energized even though electrical power is not being supplied at all times, such as during construction when an outlet is fully connected but the main breaker has not been activated.

An aperture (9, 11) can be disposed in any surface (aka wall) of the enclosure. Depending on the location of the aperture, a conductor may be bent to accommodate insertion into a socket or connection to a connector. In one aspect, a method of connecting an electrical switch or outlet 30 to a bus bar comprises the steps of obtaining a switch box or outlet box 30 consisting of an enclosure 2 and a bus bar 3, the enclosure 2 having an aperture 9 disposed in a wall 15 thereof, the bus bar having one or more female sockets 19 adapted to be capable of releasably securing a conductor; inserting a portion of a first conductor 24 into the aperture; placing a bend in one or more of the portion of the first conductor 24 or a first end of a second conductor 34; releasably connecting the portion of the first conductor 24 into one of said one or more female sockets 19; releasably connecting the first end of a second conductor 34 to one of said one or more female sockets 19; releasably connecting a second end of said second conductor 34 to a connector 31 of an outlet or switch.

In one aspect, a method of energizing an electrical switch or outlet 30 comprises the steps of: inserting a three conductor wire 23 into an aperture (e.g. first or second aperture 9, 11) of the enclosure 2; placing a bend in a hot conductor 24 of the three conductor wire 23 such that a portion of the hot conductor 24 is horizontally oriented; inserting (aka releasably connecting) said horizontally oriented portion of the hot conductor 24 into said one or more horizontally oriented female sockets 19 of said first bus bar 3; releasably connecting a first end of a second hot conductor 34 to said one or more horizontally oriented female sockets 19 of said first bus bar 3; releasably connecting a second end of said second hot conductor 34 to a hot connector 31 of an outlet or switch 30; placing a bend in a neutral conductor 25 of the three conductor wire 23 such that a portion of the neutral conductor 25 is horizontally oriented; inserting said horizontally oriented portion of the neutral conductor 25 into said one or more horizontally oriented female sockets 19 of said second bus bar 5; releasably connecting a first end of a second neutral conductor 35 to said one or more horizontally oriented female sockets 19 of said second bus bar 5; releasably connecting a second end of said second neutral conductor 35 to a neutral connector 32 of said outlet or switch 30; placing a bend in a ground conductor 26 of the three conductor wire 23 such that a portion of the ground conductor 26 is horizontally oriented; inserting said horizontally oriented portion of the ground conductor 26 into said one or more horizontally oriented female sockets 19 of said third bus bar 7; releasably connecting a first end of a second ground conductor 36 to said one or more horizontally oriented female sockets 19 of said third bus bar 7; releasably connecting a second end of said second ground conductor 36 to a ground connector 33 of said outlet or switch 30; whereby the electrical switch or outlet is energized without wire nuts.

As shown in FIG. 1, apertures 9, 11 are positioned above bus bars 3 & 5, respectively. In one aspect, additional apertures (not shown) are used to facilitate access to set screws 21 (FIG. 5) of third bus bar 7. Such apertures are positioned to allow a screwdriver to be inserted through such aperture in order to adjust set screws 21.

It should be understood that the designation of bus bars can be changed. For example, in one aspect, first bus bar 3 is the "neutral" conductor, second bus bar 5 is the "hot" conductor, and third bus bar 7 is the "ground" conductor. One advantage of this topology is that the neutral and ground bus bars are in close proximity according to their electrical potential.

The invention is in no way limited to the specifics of any particular embodiments and examples disclosed herein. For example, the terms "aspect," "example," "preferably," "alternatively," and the like denote features that may be preferable but not essential to include in some embodiments of the invention. In addition, details illustrated or disclosed with respect to any one aspect of the invention may be used with other aspects of the invention. Additional elements and/or steps may be added to various aspects of the invention and/or some disclosed elements and/or steps may be subtracted from various aspects of the invention without departing from the scope of the invention. Singular elements/steps imply plural elements/steps and vice versa. Some steps may be performed serially, in parallel, in a pipelined manner, or in different orders than disclosed herein.

Many other variations are possible which remain within the content, scope, and spirit of the invention, and these variations would become clear to those skilled in the art after perusal of this application.

What is claimed is:

1. A switch box or outlet box with no wire nuts consisting of:
   an enclosure, a first bus bar, a second bus bar, and a third bus bar;
   the first bus bar, the second bus bar, and the third bus bar each being elongate and having a rectangular cross section, and each having one or more horizontally oriented female sockets adapted to be capable of releasably securing a conductor;
   the first bus bar being mounted to a back wall of the enclosure;
   the second bus bar being mounted to the back wall of the enclosure;
   the third bus bar being mounted to a bottom wall of the enclosure;
   the enclosure having a first aperture disposed in a top wall thereof;
   the first aperture being adapted such that a vertically oriented wire can be inserted therein;
   the back wall of the enclosure being connected to the top wall of the enclosure;
   the back wall of the enclosure being connected to the bottom wall of the enclosure;
   the enclosure having an open front disposed opposite to the back wall of the enclosure;
   the first aperture being aligned with the first bus bar;

the enclosure having a second aperture disposed in the top wall thereof;

the second aperture being aligned with the second bus bar.

2. A method of connecting an electrical switch or outlet comprising the steps of:

obtaining the switch box or outlet box of claim 1;

inserting a portion of a first conductor into the first or second aperture;

placing a bend in one or more of the portion of the first conductor or a first end of a second conductor;

releasably connecting the portion of the first conductor into one of said one or more female sockets;

releasably connecting the first end of a second conductor to one of said one or more female sockets;

releasably connecting a second end of said second conductor to a connector of an outlet or switch.

3. A method of energizing an electrical switch or outlet comprising the steps of:

obtaining the switch box or outlet box of claim 1;

inserting a three conductor wire into the first or second aperture of the enclosure;

placing a bend in a hot conductor of the three conductor wire such that a portion of the hot conductor is horizontally oriented;

releasably connecting said horizontally oriented portion of the hot conductor into one of said one or more horizontally oriented female sockets of said first bus bar;

releasably connecting a first end of a second hot conductor to one of said one or more horizontally oriented female sockets of said first bus bar;

releasably connecting a second end of said second hot conductor to a hot connector of an outlet or switch;

placing a bend in a neutral conductor of the three conductor wire such that a portion of the neutral conductor is horizontally oriented;

releasably connecting said horizontally oriented portion of the neutral conductor into one of said one or more horizontally oriented female sockets of said second bus bar;

releasably connecting a first end of a second neutral conductor to one of said one or more horizontally oriented female sockets of said second bus bar;

releasably connecting a second end of said second neutral conductor to a neutral connector of said outlet or switch;

placing a bend in a ground conductor of the three conductor wire such that a portion of the ground conductor is horizontally oriented;

releasably connecting said horizontally oriented portion of the ground conductor into one of said one or more horizontally oriented female sockets of said third bus bar;

releasably connecting a first end of a second ground conductor to one of said one or more horizontally oriented female sockets of said third bus bar;

releasably connecting a second end of said second ground conductor to a ground connector of said outlet or switch;

whereby the electrical switch or outlet is energized without wire nuts.

\* \* \* \* \*